Figure 1:
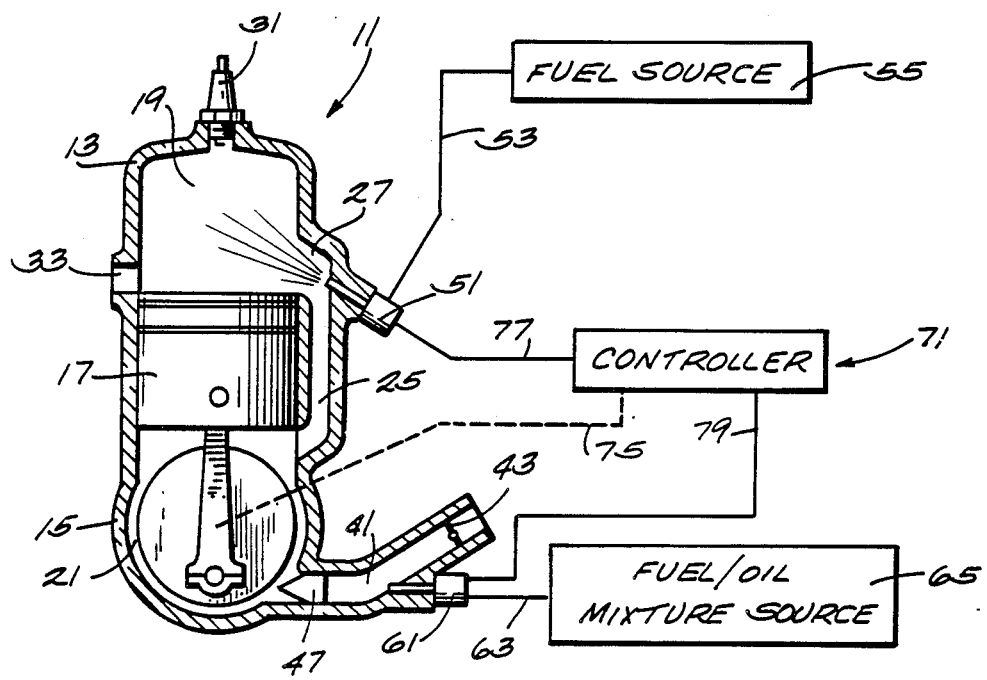

United States Patent [19]

Maier

[11] Patent Number: 4,779,581
[45] Date of Patent: Oct. 25, 1988

[54] DUAL FUEL INJECTION SYSTEM FOR TWO STROKE INTERNAL COMBUSTION ENGINE

[75] Inventor: Gerhard A. Maier, Mundelein, Ill.

[73] Assignee: Outboard Marine Corporation, Waukegan, Ill.

[21] Appl. No.: 112,472

[22] Filed: Oct. 26, 1987

[51] Int. Cl.$^4$ .............................................. F02B 33/04
[52] U.S. Cl. .................. 123/73 A; 123/73 B; 123/73 AD
[58] Field of Search ............ 123/73 A, 73 AD, 73 B, 123/73 BA, 73 C

[56] References Cited

U.S. PATENT DOCUMENTS

| | | |
|---|---|---|
| 4,216,747 | 8/1980 | Noguchi et al. . |
| 4,237,831 | 12/1980 | Noguchi et al. . |
| 4,286,553 | 9/1981 | Baltz et al. . |
| 4,401,063 | 8/1983 | Haase . |
| 4,446,833 | 5/1984 | Matsushita et al. ............... 123/73 C |
| 4,462,346 | 7/1984 | Haman et al. . |
| 4,625,688 | 12/1986 | Takayasu . |
| 4,671,220 | 6/1987 | Inoue et al. ......................... 123/73 A |
| 4,700,671 | 10/1987 | Matsushita ......................... 123/73 R |

FOREIGN PATENT DOCUMENTS

| | | |
|---|---|---|
| 678269 | 6/1939 | Fed. Rep. of Germany ........ 123/73 AD |
| 0027731 | 3/1978 | Japan ................................. 123/73 A |
| 0143121 | 8/1983 | Japan ................................. 123/73 A |

Primary Examiner—Charles J. Myhre
Assistant Examiner—David A. Okonsky
Attorney, Agent, or Firm—Michael, Best & Friedrich

[57] ABSTRACT

Disclosed herein is a two stroke internal combustion engine comprising a cylinder, a crankcase extending from the cylinder, a piston reciprocal in the cylinder and defining, with the cylinder, a variable volume combustion chamber and defining, with the crankcase, a crankcase chamber having a volume which varies inversely with respect to the volume of the combustion chamber, a transfer passage communicating, subject to piston movement, between the crankcase chamber and the combustion chamber, an air intake passage extending from the crankcase chamber and including therein a throttle valve movable between opened and closed positions to control engine speed, a reed valve located between the air intake passage and the crankcase chamber for controlling communication between the air intake passage and the crankcase chamber, a first fuel injector communicating with the transfer passage, a second fuel injector communicating with the air intake passage between the reed valve and the throttle valve, and a controller for actuating the first fuel injector to supply fuel to the transfer passage at relatively low engine speeds and for actuating the second fuel injector to supply fuel to the intake passage at relatively high engine speeds.

4 Claims, 1 Drawing Sheet

U.S. Patent Oct. 25, 1988 4,779,581

DUAL FUEL INJECTION SYSTEM FOR TWO STROKE INTERNAL COMBUSTION ENGINE

BACKGROUND OF THE INVENTION

The invention relates generally to two-stroke internal combustion engines, and more particularly, to fuel supply arrangements for such engines.

One prior two-stroke engine used in boat racing employed a fuel injector which was located in an air intake passage communicating through reed valve means with a two stroke engine crankcase and which supplied the engine with fuel mixed with oil. The inlet passage included a throttle valve upstream of the fuel injector.

Another prior two-stroke engine employed a fuel injector which was located in a transfer passage between a crankcase chamber and the combustion chamber and which supplied fuel unmixed with oil.

Attention is directed to Haman U.S. Pat. No. 4,462,346 which discloses fuel supply through the crankcase at high speeds and fuel supply through a port in a transfer passage, independently of the crankcase, at slow speeds. However, both supplies are provided by orifices which are subject to vacuum and do not involve fuel injection. In addition, both supplies use the same fuel or fuel mixture.

Attention is also directed to the following U.S patents:

U.S. Pat. Nos.

4,216,747, Noguchi, et al., Aug. 12, 1980
4,237,831, Noguchi, et al., Dec. 9, 1980
4,286,553, Baltz, et al., Sept. 1, 1981
4,401,063, Haase, Aug. 30, 1983
4,462,346, Haman, et al., July 31, 1984
4,625,688, Takayasu, Dec. 2, 1986

SUMMARY OF THE INVENTION

The invention provides a two stroke internal combustion engine comprising a cylinder, a crankcase extending from the cylinder, a piston reciprocal in the cylinder and defining, with the cylinder, a variable volume combustion chamber and defining, with the crankcase, a crankcase chamber having a volume which varies inversely with respect to the volume of the combustion chamber, a transfer passage communicating, subject to piston movement, between the crankcase chamber and the combustion chamber, an air intake passage extending from the crankcase chamber and including therein a throttle valve movable between opened and closed positions to control engine speed, check valve means located between the air intake passage and the crankcase chamber for controlling communication between the air intake passage and the crankcase chamber, a first fuel injector communicating with the transfer passage, a second fuel injector communicating with the air intake passage between the check valve means and the throttle valve, and control means for actuating the first fuel injector to supply fuel to the transfer passage at relatively low engine speeds and for actuating the second fuel injector to supply fuel to the intake passage at relatively high engine speeds.

One of the principal objects of the invention is to provide a two-stroke engine which develops maximum power with less exhaust pollution and which uses less fuel than previous two-stroke fuel supply arrangements.

Before explaining one embodiment of the invention in detail, it is to be understood that the invention is not limited in its application to the details of construction and the arrangement of components set forth in the following description or illustrated in the drawings. The invention is capable of other embodiments and of being practiced and carried out in various ways. Also, it is to be understood that the phraseology and terminology employed herein is for the purpose of description and should not be regarded as limiting.

DRAWINGS

FIG. 1 is a schematic view of a two-stroke engine embodying various of the features of the invention.

GENERAL DESCRIPTION

Shown schematically in FIG. 1 is a two-stroke internal combustion engine 11 including a cylinder 13 and a crankcase 15 extending from the cylinder 13. Reciprocably movable in the cylinder 13 is a piston 17 which, together with the cylinder 13, defines a variable volume combustion chamber 19 and which, together with the crankcase, defines a crankcase chamber 21 which varies in volume inversely with respect to the variation of volume of the combustion chamber 19.

Extending between the cylinder 13 and the crankcase 15, in by-passing relation to the piston 17, is a transfer passage 25 which, in the disclosed construction, communicates openly at one end with the crankcase chamber 21 and, at its other end, terminates in a transfer port 27 which is opened and closed in relation to the combustion chamber 19 in response to piston reciprocation.

Also provided in the cylinder 31 are a spark plug 31 and an exhaust port 33.

Extending from the crankcase 15 is an air intake passage 41 including a throttle valve 43 which can be opened and closed in response to operator activity to regulate the engine speed between low or idle, mid-range, and relatively high speeds. The intake passage 41 communicates with the crankcase chamber 21 through check valve means in the form of one or more reed valves 47 which permit inflow to the crankcase chamber 21 and which prevent outflow from the crankcase chamber 21.

As thus far described, the engine 11 is generally of conventional construction.

Communicating with the transfer passage 25 is a first fuel injector 51 which is operable to supply fuel through the transfer port 27 to the combustion chamber 19 when suitably actuated. Such a fuel injector, in an engine as described immediately above, has been employed in a prior construction as set forth in the Background of the Invention. Any suitable construction can be employed to provide the fuel injector 51.

As shown, the fuel injector 51 is connected through a conduit 53 to a suitable source 55 of fuel.

While the first fuel injector 51 has been described and illustrated as communicable with the transfer passage 25, the fuel injector 51 could be arranged to inject fuel directly into the combustion chamber 19.

Communicating with the air inlet passage 41 between the throttle valve 43 and the reed valve 47 is a second fuel injector 61 which is operable to supply fuel through the air intake passage 41 to the crankcase chamber 21 and through the transfer passage 25 to the combustion chamber 19. Such a fuel injector in an engine as described above, but without the first mentioned fuel injector 51, has been employed in a prior construction as set forth in the Background of the Invention. The fuel injector 61 can be constructed in any suitable fashion.

As shown, the fuel injector 61 is connected, through a conduit 63, to a suitable source 65 of a suitable fuel/oil mixture.

Connected to the fuel injectors 51 and 61 is a controller 71 which includes suitable means well known in the art and therefore not shown for activating the first fuel injector 51 to supply fuel to the transfer passage 25, and hence to the combustion chamber 19, and for simultaneously deactivating the second fuel injector 61 to prevent fuel supply therefrom when the engine 11 is operating at relatively low or idle speed and at mid-range speeds. The means referred to immediately above is also operable for activating the second fuel injector 61 to supply fuel or fuel/oil mixture to the air intake pasage 41 and thence through the crankcase chamber 21 and transfer passage 25 to the combustion chamber 19 and for simultaneously deactivating the first fuel injector 51 to prevent fuel supply therefrom when the engine 11 is operating at relatively high speeds.

The controller 71 can be constructed in any suitable fashion and is operably connected to the engine 13, as schematically shown at 75, to one or more inputs reflecting engine speed and is operably connected to the fuel injectors 51 and 61, as schematically shown as 77 and 79, for transmission thereto outputs to activate and deactivate the injectors 51 and 61 in accordance with engine speed as already explained.

Preferably, the fuel supplied to the intake passage fuel injector 61 is mixed with a suitable amount of oil or lubricant, whereas the transfer passage fuel injector 51 is arranged to inject fuel unmixed with oil.

While disclosed in connection with a single cylinder engine, the invention is obviously applicable to multi-cylinder engines.

The disclosed construction permits the engine to develop more power with less exhaust pollution and to use less fuel than prior injection systems or carburetors.

Various of the features of the invention are set forth in the following claims.

I claim:

1. A two stroke internal combustion engine comprising a cylinder, a crankcase extending from said cylinder, a piston reciprocal in said cylinder and defining, with said cylinder, a variable volume combustion chamber and defining, with said crankcase, a crankcase chamber having a volume which varies inversely with respect to the volume of said combustion chamber, a transfer passage communicating, subject to piston movement, between said crankcase chamber and said combustion chamber, an air intake passage extending from said crankcase chamber and including therein a throttle valve movable between opened and closed positions to control engine speed, check valve means located between said air intake passage and said crankcase chamber for controlling communication between said air intake passage and said crankcase chamber, a first fuel injector communicating with said transfer passage, a second fuel injector communicating with said air intake passage between said check valve means and said throttle valve, and control means for actuating said first fuel injector to supply fuel to said transfer passage at relatively low engine speeds and for actuating said second fuel injector to supply fuel to said intake passage at relatively high engine speeds.

2. An internal combustion engine in accordance with claim 1 wherein said second fuel injector is connected to a source of a fuel/oil mixture.

3. An internal combustion engine in accordance with claim 1 wherein said control means also operates to actuate said first fuel injector at mid-range speeds.

4. A two stroke internal combustion engine comprising a cylinder, a crankcase extending from said cylinder, a piston reciprocal in said cylinder and defining, with said cylinder, a variable volume combustion chamber and defining, with said crankcase, a crankcase chamber having a volume which varies inversely with respect to the volume of said combustion chamber, a transfer passage communicating, subject to piston movement, between said crankcase chamber and said combustion chamber, an air intake passage extending from said crankcase chamber and including therein a throttle valve movable between opened and closed positions to control engine speed, check valve means located between said air intake passage and said crankcase chamber for controlling communication between said air intake passage and said crankcase chamber, a first fuel injector communicating with said transfer passage, a second fuel injector communicating with said air intake passage between said check valve means and said throttle valve, and control means for actuating said first fuel injector to supply fuel unmixed with oil to said transfer passage and for simultaneously preventing injection of fuel/oil mixture by said second fuel injector when said engine is operating at relatively low and mid-range speeds, and for actuating said second fuel injector to supply fuel/oil mixture to said intake passage and for simultaneously preventing injection of fuel by said first fuel injector when said engine is operating at relatively high speeds.

* * * * *